(12) United States Patent
Vlahakis (10) Patent No.: US 8,998,239 B2
(45) Date of Patent: Apr. 7, 2015

(54) TRAILER AND METHOD OF USE

(76) Inventor: John A. Vlahakis, Katy, TX (US)

( * ) Notice: Subject to any disclaimer, the term of this patent is extended or adjusted under 35 U.S.C. 154(b) by 0 days.

(21) Appl. No.: 13/540,822

(22) Filed: Jul. 3, 2012

(65) Prior Publication Data
US 2013/0009385 A1      Jan. 10, 2013

Related U.S. Application Data

(60) Provisional application No. 61/505,726, filed on Jul. 8, 2011.

(51) Int. Cl.
| | | |
|---|---|---|
| *B62D 63/08* | (2006.01) | |
| *B60G 11/24* | (2006.01) | |
| *B60S 9/02* | (2006.01) | |
| *B66C 23/80* | (2006.01) | |
| *B60P 3/06* | (2006.01) | |
| *B60B 37/10* | (2006.01) | |
| *B60G 11/22* | (2006.01) | |

(52) U.S. Cl.
CPC ............. *B60G 11/24* (2013.01); *Y10T 29/4973* (2015.01); *B60S 9/02* (2013.01); *B66C 23/80* (2013.01); *B60P 3/062* (2013.01); *B60B 37/10* (2013.01); *B60G 11/225* (2013.01); *B60G 2202/142* (2013.01); *B60G 2300/04* (2013.01)

(58) Field of Classification Search
CPC .................. B60G 11/24; B60G 11/225; B60G 2202/142; B60G 2300/04; Y10T 29/4973; B60S 9/02; B66C 23/80; B60P 3/062; B60B 37/10

USPC ......... 280/475, 460.1, 400, 763.1; 301/124.1, 301/131; 29/402.08
See application file for complete search history.

(56) References Cited

U.S. PATENT DOCUMENTS

| | | | |
|---|---|---|---|
| 3,892,423 | A | 7/1975 | Smith |
| 4,806,065 | A | 2/1989 | Holt et al. |
| 5,411,287 | A * | 5/1995 | Henschen .............. 280/124.169 |
| 5,628,607 | A | 5/1997 | Kyzer et al. |
| 6,299,259 | B1 | 10/2001 | MacKarvich |
| 6,394,734 | B1 | 5/2002 | Landoll et al. |
| 6,679,511 | B2 | 1/2004 | Parker et al. |
| 7,134,562 | B2 | 11/2006 | Burkett |
| 7,143,968 | B2 | 12/2006 | Brock et al. |
| 7,997,607 | B2 * | 8/2011 | Voves ........................... 280/408 |
| 2010/0133783 | A1 * | 6/2010 | Walstrom et al. ............. 280/475 |

* cited by examiner

*Primary Examiner* — Joseph Rocca
*Assistant Examiner* — Jacob Knuston
(74) *Attorney, Agent, or Firm* — Keeling Patents & Trademarks, LLC; Kenneth A. Keeling; Melissa M. Martinez (57) ABSTRACT

A low profile trailer and method of use with mountable equipment includes an axle system allowing reduced trailer deck height, open trailer sides, and peripheral trailer stabilizer legs, said axle system comprising aligned axle structures at each of two sides of the trailer, each said axle structure including a sleeve fixedly attached to the trailer body and including an axle assembly slidably received in the sleeve such that the sleeve and axle assembly is structured to allow removal and insertion of an axle assembly on one trailer side without the necessity of replacing the axle assembly on the other trailer side.

2 Claims, 9 Drawing Sheets

TRAILER AND METHOD OF USE

CROSS-REFERENCE TO RELATED APPLICATIONS

This application claims the benefit of U.S. provisional application Ser. No. 61/505,726 filed on Jul. 8, 2011, which is incorporated herein by reference as if reproduced in full below.

STATEMENT REGARDING FEDERALLY SPONSORED RESEARCH OR DEVELOPMENT

Not applicable.

FIELD OF THE DISCLOSURE

The disclosure relates generally to trailers, and more particularly, to a low profile trailer for carrying heavy loads and a method of use.

BACKGROUND

Transportion of equipment such as tractors, backhoes, excavators and bulldozers often requires that the equipment be loaded onto a trailer. Rolling equipment onto or off a trailer involves consideration of, among other things, the height of the deck of the trailer, the angle of the ramp, the size or weight of the equipment or the amount of space available to unload the equipment.

Equipment is often provided with its own independent drive means in order to move the equipment, including conventional wheels and drive tracks.

Trailers designed for transporting equipment require compatible support structures such as axles, wheels and related components. Replacement of conventional trailer axles typically requires that the trailer be out of service to allow lifting of the trailer and replacement of the axle structure.

U.S. Pat. No. 6,299,259 to MacKarvich discloses a conventional torsion axle assembly having a spindle, a torsion arm and a torsion bar. The '259 patent teaches readily removable, universally mountable spindle axles. As shown at FIG. 5 of the '259 patent, commercially practiced axles are mounted under the trailer frame.

U.S. Pat. No. 5,411,287 to Henschen discloses an axle for a vehicle with first stage and second stage torsion shafts and with an axle tube extending the full width of the vehicle with wheel assembly connection assemblies at each end of the axle.

To limit the risk of accidents during operations, equipment often comes outfitted with a set of integral stabilizers, which are a set of support arms that engage the surface of the ground below the equipment and stabilize or suspend the equipment off of the ground, thereby increasing lateral support of the equipment during operations and limiting overturn moment of the equipment.

BRIEF SUMMARY

A low profile trailer and method of use with equipment includes a low profile trailer and axle assembly.

In an example embodiment, a low profile trailer for use with equipment allows reduced trailer deck height, thereby facilitating on-load and offload of equipment.

In an example embodiment, a low profile trailer for use with equipment includes open sides to allow equipment on the trailer to operate from the trailer without the necessity of unloading the equipment for operational purposes.

In an example embodiment, a low profile trailer for use with equipment having stabilizer legs includes open sides to allow equipment on the trailer to deploy stabilizer arms while the equipment is mounted on the trailer without the necessity of unloading the equipment for operational purposes.

In an example embodiment, a trailer axle structure set includes at least one axle assembly provided on each of two sides of a trailer, each said axle structure including a sleeve fixedly attached to the trailer body and including an axle assembly slidably received in the sleeve such that the sleeve and axle assembly is structured to allow replacement of an axle on one side without the necessity of replacing the axle on the other side of the trailer.

The method of use of the trailer includes an equipment loading step, a stabilizer deployment step, an equipment operation step, and stabilizer withdrawal step. Other related steps may be performed.

An axle replacement method comprises raising a single side of the trailer, sliding disengagement of an axle assembly from an axle sleeve, inserting a replacement axle assembly in the axle sleeve, and lowering the trailer side.

DESCRIPTION OF EXAMPLE EMBODIMENTS

Figure 1:
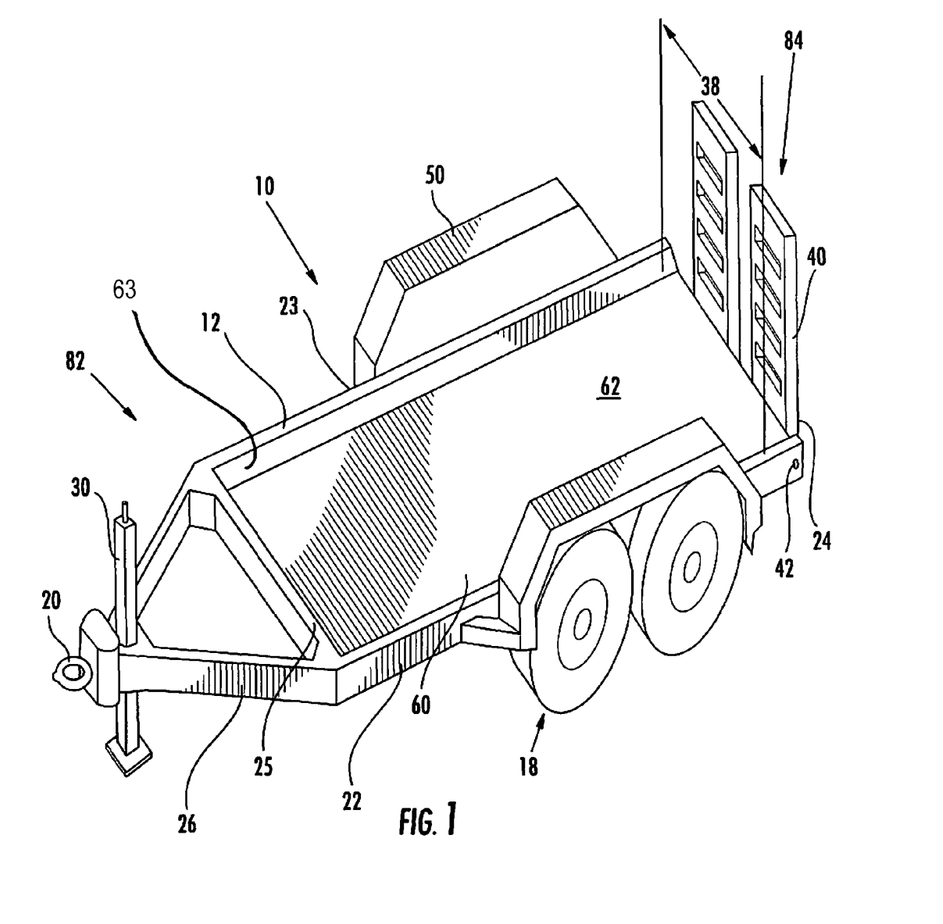
FIG. 1 is a perspective view of an exemplary low profile trailer.

Referring to FIG. 1, an example embodiment of a low profile trailer 10 is depicted. The example embodiment of trailer 10 includes wheel assemblies 18, a frame 12, and cargo deck 60. Trailer front 82 and trailer rear 84 are identified for reference.

Figure 3:
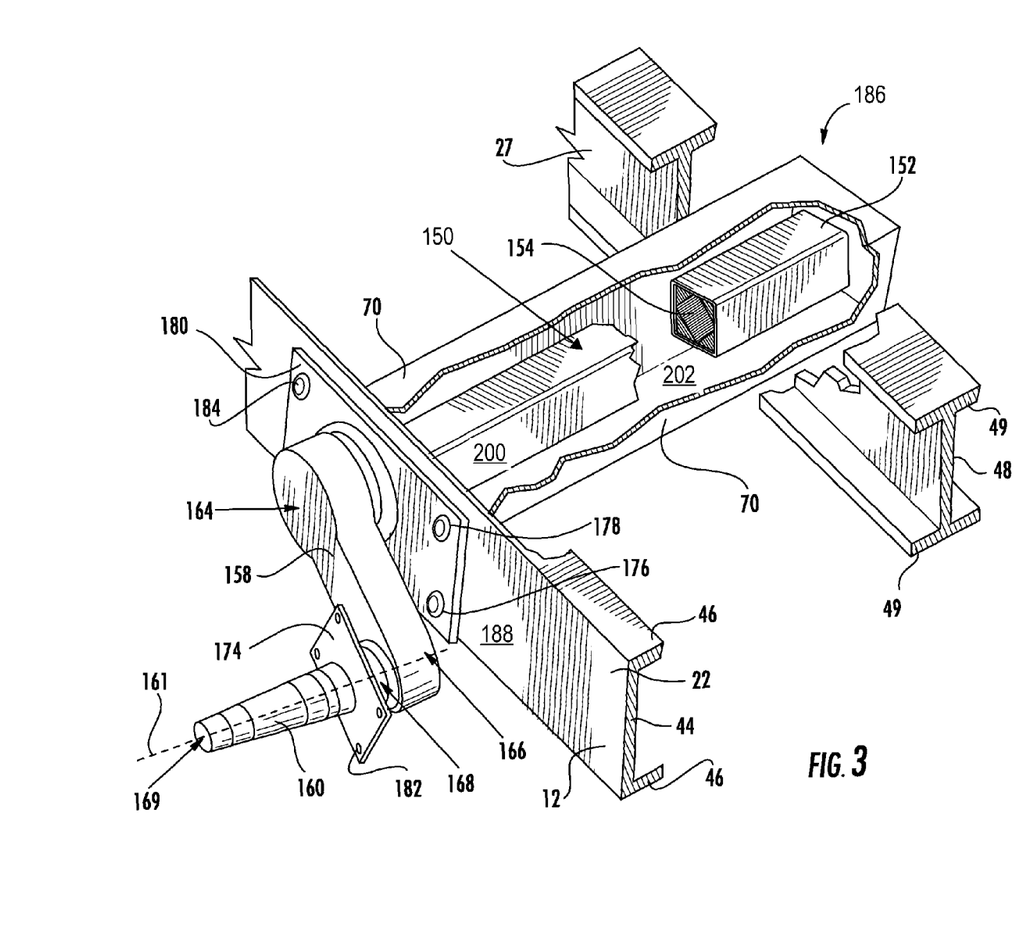
FIG. 3 is a perspective partially cut-away view of an exemplary axle assembly.
Figure 4:
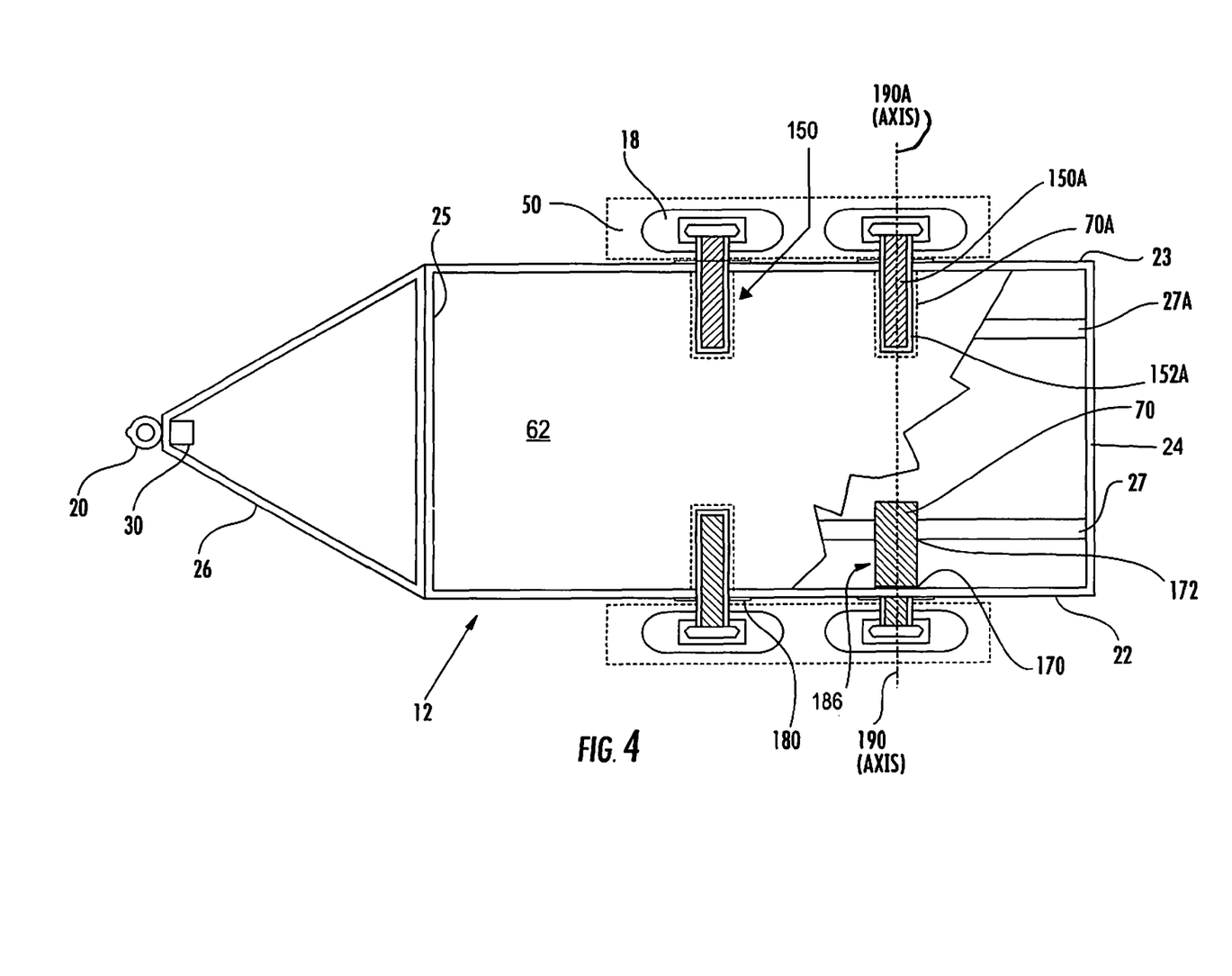
FIG. 4 is an overhead partially cut-away view of an exemplary trailer with multiple axle assemblies.

Referring to FIGS. 3 and 4, axle assemblies 150 and housings 70 are mounted in support frame 12 to allow the low profile trailer structure. Axle assemblies 150 extend perpendicular to frame sides 22 and 23 and extend less than and up to one-half of the width of frame 12. Axle assemblies 150 and housings 70 are constructed to allow removal and replacement of a single axle assembly 150.

Trailer 10 has one or more stabilizing jacks 30 connected to frame 12 and/or tongue 26. Each stabilizing jack 30 is operable to be extended to ground level to stabilize or suspend trailer 10 or a portion of trailer 10. In the example embodiment shown in FIG. 2, trailer 10 has a stabilizing jack 30 mounted to each of side frames 22, 23 proximate back 84 of trailer and a stabilizing jack 30 mounted to tongue 26 at front 82 of trailer.

Frame 12 is generally comprised of first side frame member 22, second side frame member 23, rear frame member 24 and front frame member 25. First side frame member 22, second side frame member 23 rear frame member 24 and front frame member 25 collectively define a rectangular frame 12. A tongue 26 at the front 82 of trailer 10 and a coupler 20 allow for connection of trailer 10 to a vehicle (not shown).

Cargo deck 60 is a planar structure supported on frame 12. Cargo deck 60 is sized and structured of sufficient strength, width and length to accommodate and support equipment 100.

A ramp 40 is attached at the rear 84 of trailer 10. As is commonly practiced, ramp 40 is rotatably attached to rear frame member 24 by hinge 42.

Figure 2:
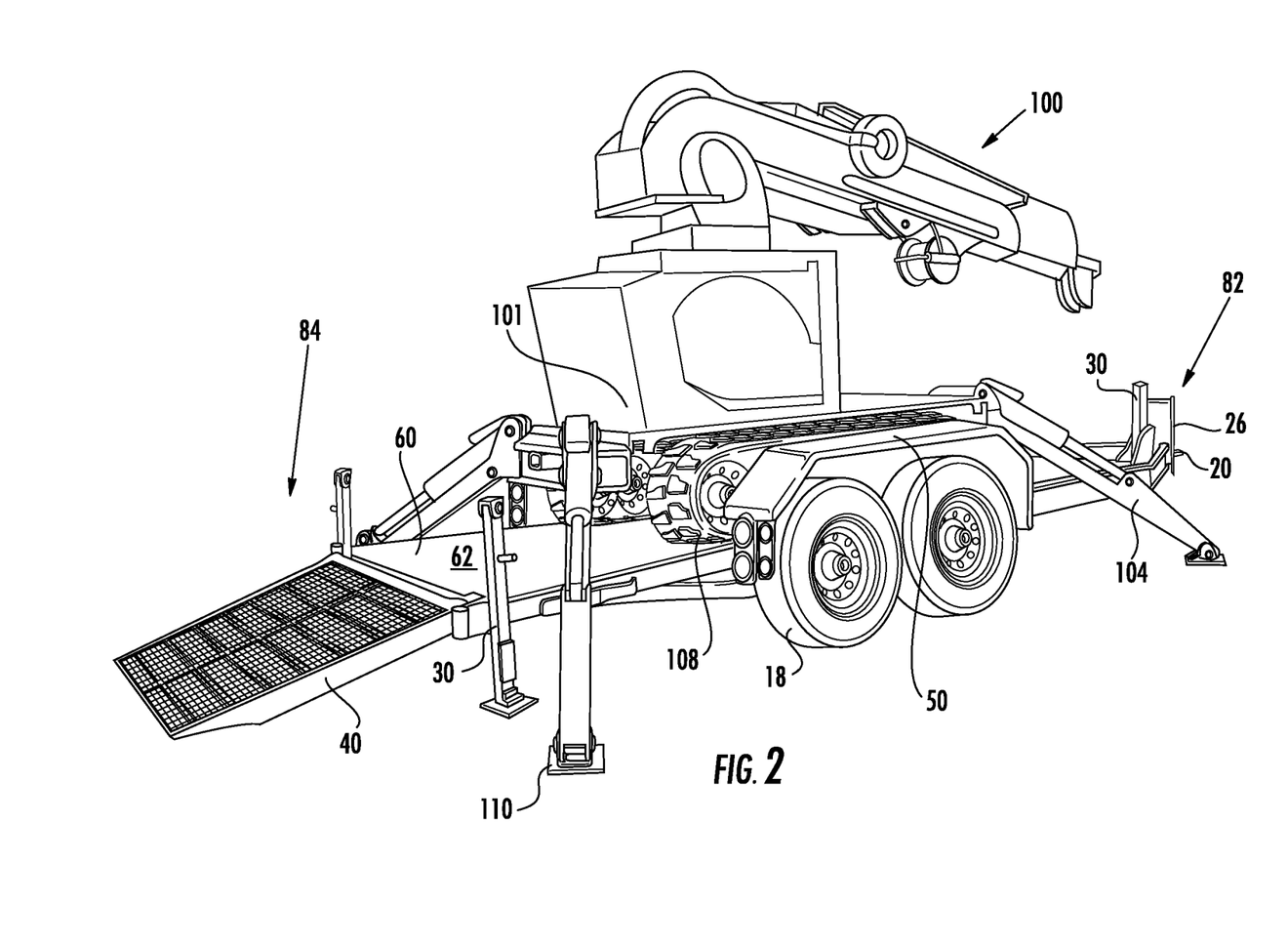
FIG. 2 is a perspective view of an exemplary low profile trailer with a conventional boom truck loaded on the trailer.

Referring to FIG. 2, a view of trailer 10 with mobile equipment 100 loaded thereon is depicted. Stabilizers 104 extend outwardly from equipment 100. Depicted equipment 100 comprises a conventional mobile boom crane, mounted on tracks 108. Equipment 100 has four (4) stabilizers 104, a stabilizer 104 placed at each corner of equipment 100. As is known in the art, stabilizers 104 are mounted on equipment and are operable to a retracted position and a plurality of extended positions. Stabilizers 104 are retracted for storage and transport and operated to an appropriate extended position for support of equipment 100 during operation of equipment 100.

The teachings of the present invention are independent of the type of equipment 100 utilized, the trailer 10 being adaptable for use with a variety of equipment utilizing stabilizers 104 and being useful for normal trailer functions.

Referring to FIG. 3 a torsion axle assembly 150 is depicted. Each torsion axle assembly 150 is retained in a housing 70. Each housing 70 is fixedly attached to frame 12.

Referring to FIGS. 1 through 5, the low profile aspect of trailer 10 is depicted. In the embodiment of FIGS. 1 and 2, four (4) wheel assemblies 18 are attached to four torsion axle assemblies 150 with each axle assembly 150 received in a housing 70. Fewer or more wheel assemblies 18 and axle assemblies 150 may be practiced on a single frame 12.

Figure 4A:
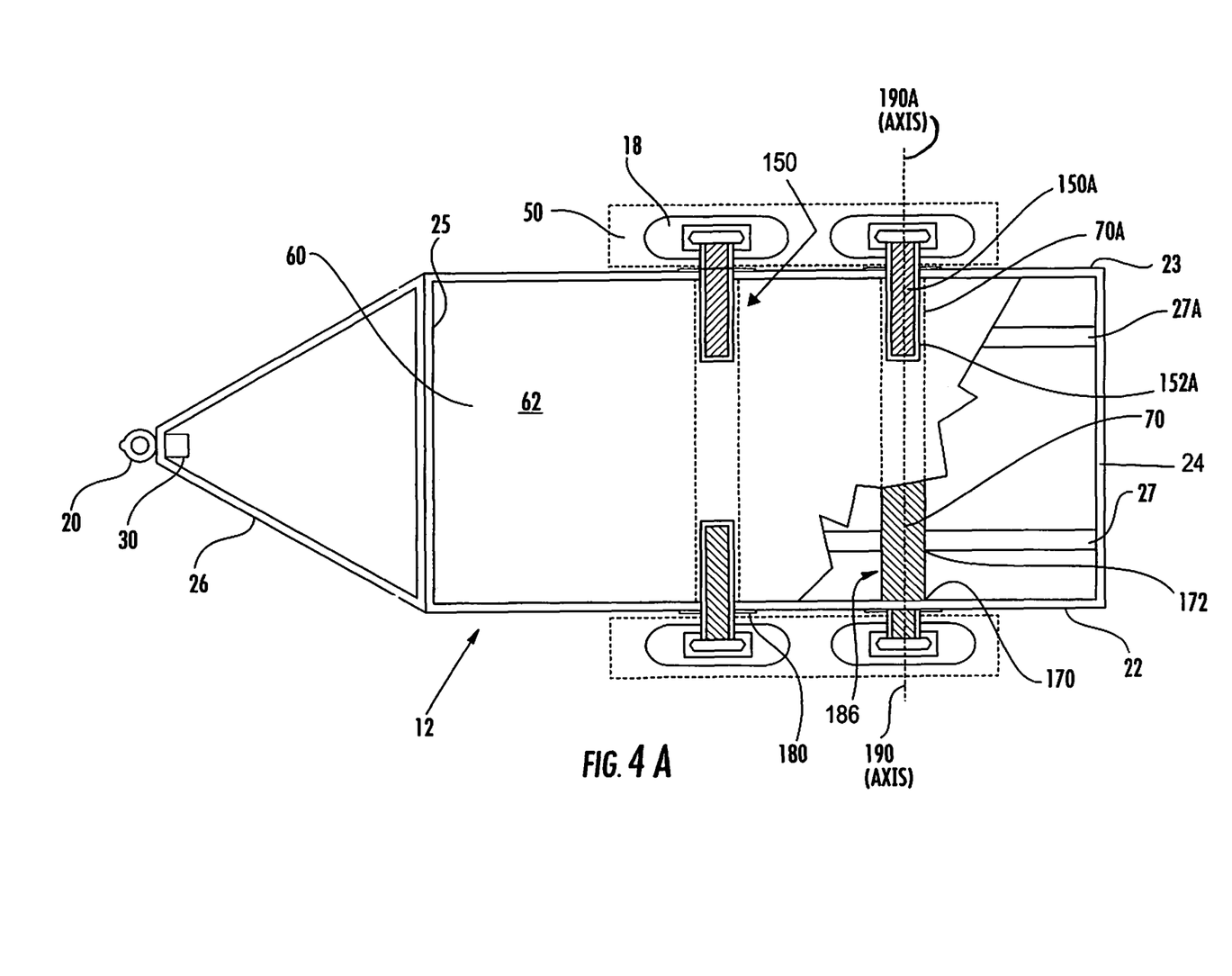
FIG. 4A is an overhead partially cut-away view of an alternative embodiment of the trailer.

Referring to FIGS. 4 and 4A, linear support beams 27 are attached to frame 12. Support beams 27 extend intermediate side frame member 22 and side frame member 23 and parallel to side frame member 22 and side frame member 23. Support beams 27 are attached to rear frame member 24 and front frame member 25. In an example embodiment, support beams 27 will extend the distance from rear frame member 24 and front frame member 25. Support beams 27 include openings 172 sized and located to receive axle housing 70. While two support beams 27 are depicted in FIGS. 4 and 4A, more support beams 27 may be provided as needed for anticipated load. Support beams 27 may be attached by transverse members (not shown) to each other and to side frame member 22 and side frame member 23.

Figure 5:
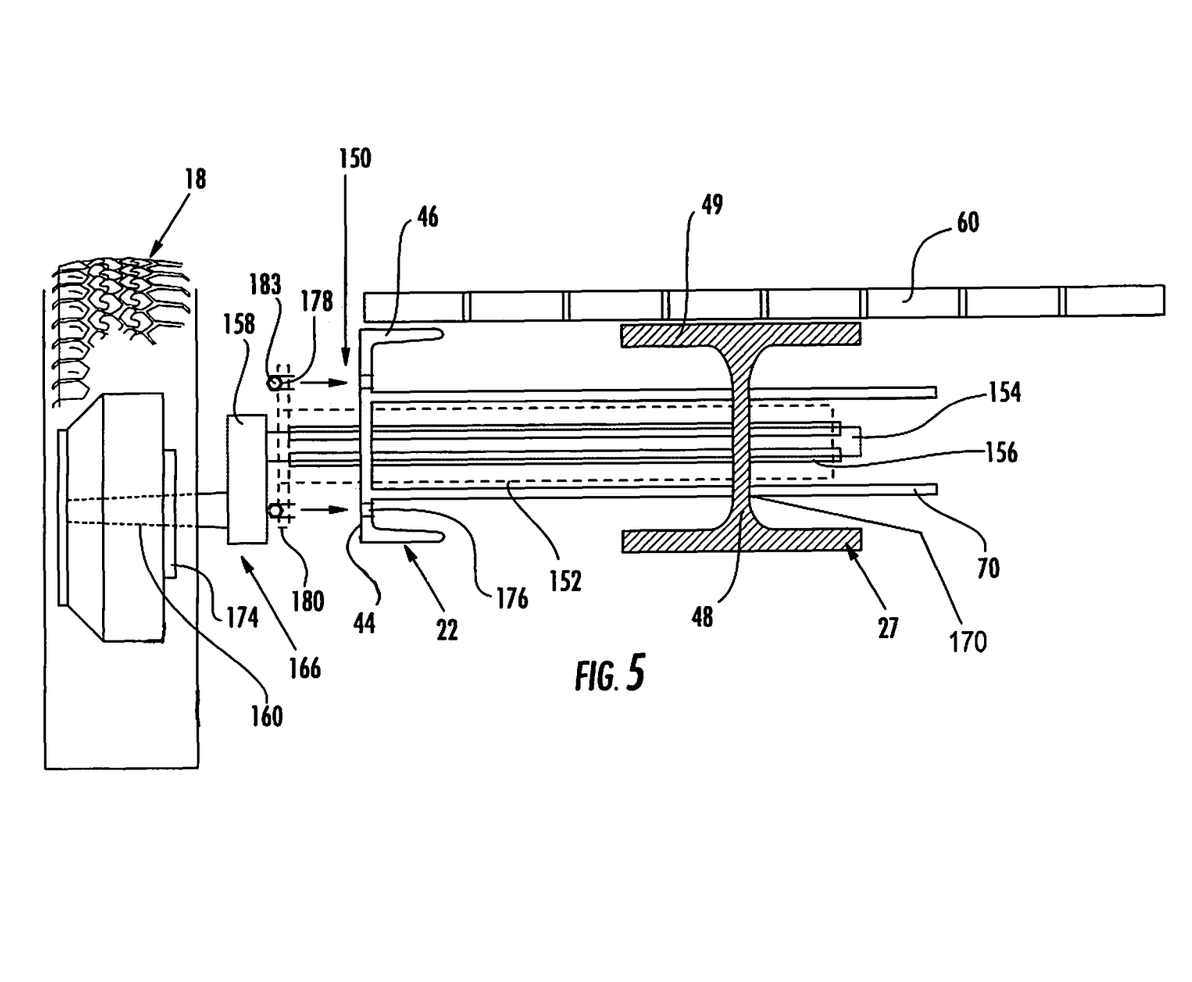
FIG. 5 is a cross-sectional view of an axle assembly, trailer frame member, cargo deck, and wheel assembly.

Referring to FIGS. 3, 4 and 5 a typical axle structure 150 is depicted. Axle structure 186 is comprised of axle housing 70 and axle assembly 150. An axle housing 70 is provided to receive each axle assembly 150 at each wheel assembly 18. Axle assembly 150 generally comprises a sleeve 152, torsion bar 154, at least one resilient element 156, a torsion arm 158, and spindle 160. In the example embodiment, axle housing 70 and axle assembly 152 are generally elongated hollow square tubular structures. Tubular structures having cross-sections of other geometric shapes, including triangular and rectangular, may be practiced within the scope of this disclosure.

Sleeve 152 of axle assembly 150 is size, shaped, and oriented within axle housing 70 so as to prevent sleeve 152 from rotating relative to axle housing 70. In the exemplary embodiment, outer surfaces 200 of sleeve 152 come into slideable contact with corresponding inner surfaces 202 of housing 70 upon insertion of sleeve 152 into housing 70. As such, rotation of sleeve 152 relative housing 70 is prevented. A rotational force exerted on sleeve 152 will be counterbalanced by equal and opposite rotational forces applied by fixed housing 70. Fewer than all outer surfaces 200 of sleeve 152 may contact inner surfaces 202 of housing 70, so long as relative rotation of sleeve 152 is prevented. Axle housing 70 extends perpendicular to its corresponding side frame member 22 through a support beam 27. Axle housing 70 is fixedly attached to side frame member 22 and support beam 27.

In an example embodiment side frame member 22 is a "C" shaped structure having a vertical bar 44 and upper and lower flanges 46 extending inwardly. In an example embodiment support beam 27 is an "I" shaped structure having a vertical bar 48 and upper and lower flanges 49 extending outwardly.

In the example embodiment, axle housing 70 extends through an opening 170 in vertical bar 44 and through an opening 172 in vertical bar 48. The openings in vertical bar 44 and vertical bar 48 are not easily viewed in FIGS. 3, 4 and 5 as the openings 170 and 172 are fully filled by axle housing 70.

Axle housing 70 is fixedly attached to each of vertical bar 44 and vertical bar 48. In an example embodiment, side frame members 22, 23, support beams 27, 27A, and axle housing 70 are constructed of steel. Axle housings 70, 70A are attached to each of side frame members 22, 23 and support beams 27, 27A, as depicted in FIG. 4, by welding.

Referring to FIGS. 3-5, an elongated torsion axle assembly 150 is provided for slideable insertion into housing 70. Torsion axle assembly 150 generally comprises a sleeve 152, torsion bar 154, at least one resilient element 156, a torsion arm 158 and spindle 160.

Housing 70 and sleeve 152 are generally elongated hollow square tubular structures. Outer width of sleeve 152 is slightly smaller than inner width of housing 70 to allow for slideable insertion of sleeve 152 into housing 70.

Sleeve 152 further includes at least one flange 180 disposed at sleeve end 152 proximate frame member 22 vertical bar 44. Flange 180 is generally planar structure. At least one bore hole 178 extends through flange 180. Flange 180 is sized and structured to abut exterior side surface 188 of side frame member 22 vertical bar 44. At least one corresponding bore hole 176 is provided in vertical bar 44 to allow flange 180 to be bolted to vertical bar 44 via at least one bolt 183.

Upon connection of flange 180 to vertical bar 44 of side frame member 22, axle assembly 150 is fixedly retained to frame 12. As housing 70 is also fixedly attached to frame 12, sleeve 152 of axle assembly 150 is fixedly positioned in relation to housing 70.

Figure 3A:
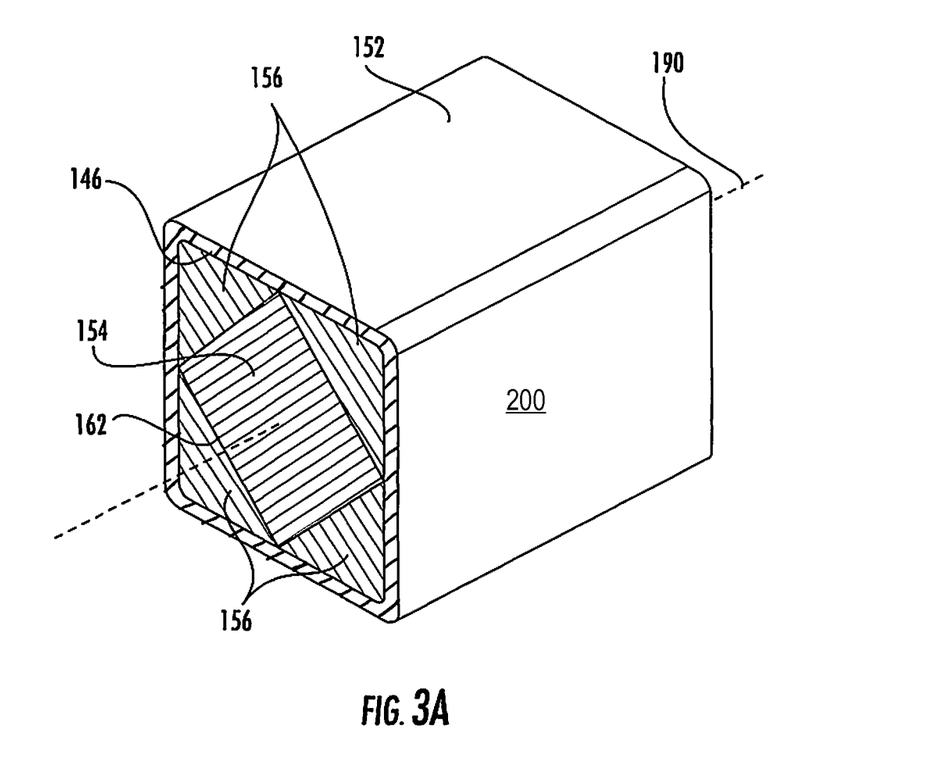
FIG. 3A is a detail of FIG. 3.

FIG. 3A depicts a cross-sectional view of torsion bar 154, sleeve 152 and resilient elements 156. Torsion bar 154 is an elongated member and has a generally square cross-sectional geometry. Torsion bar 154 has exterior lateral surfaces 162. Torsion bar 154 extends through at least a portion of sleeve 152 with the corners of torsion bar 154 offset from the corners of sleeve 152. Resilient members 156 are placed in the corner apertures 146 defined by corners of sleeve 152 and exterior lateral surfaces 162 of torsion bar 154. The resilient members 156 extend substantially the length of torsion bar 154. The resilient members 156 are positioned tightly within the corner apertures 146. Accordingly, resilient members 156 resist rotation of torsion bar 154 in relation to sleeve 152. Corner apertures 146 are not easily viewed in FIGS. 3 and 3A as the apertures 146 are fully filled by resilient members 156.

Housing 70 extends at least from side frame member 22 to support beam 27. Torsion bar 154 of axle assembly 150 extends substantially the length of housing 70.

A like housing 70A extends at least from side frame member 23 to a like support beam 27A. A like torsion bar 154A of like axle assembly 150A extends within sleeve 152A. Note that support beam 27A, torsion bar 154A, sleeve 152A, axle assembly 150A and housing 70A are equivalent structures to support beam 27, torsion bar 154, sleeve 152, axle assembly 150 and housing 70. The "A" reference is used to identify an equivalent structure.

Torsion bar 154 has a central bar axis 190. Torsion bar 154A has a central bar axis 190A. Housing 70, housing 70A, axle assembly 150 and axle assembly 150A are constructed and arranged such that bar axis 190 of axle assembly 150 is substantially aligned with bar axis 190A. Ideally, the bar axes 190 and 190A comprise a coexistent axis. In a practical embodiment, bar axis 190 and bar axis 190A are closely aligned.

In an example embodiment, torsion bar 154 is comprised of steel and resilient elements 156 are comprised of a natural or synthetic resilient material.

Referring to FIG. 3, torsion arm 158 comprises a rigid member having a pivot end 164 and a moment end 166. Torsion arm 158 pivot end 164 is fixedly attached to torsion bar 154. Torsion arm 158 is generally perpendicular to bar axis 190. Torsion arm 158 moment end 166 is distal torsion bar 154. A spindle 160 is attached to torsion arm 158 at moment end 166. Spindle 160 has a spindle axis 161. Spindle axis 161 is parallel to central bar axis 190. Each spindle 160 corresponds to and supports a wheel assembly 18. In the example embodiment, each torsion arm 158 generally extends slightly downward relative frame 12.

It is a function of each torsion axle assembly 150 to provide independent torsional suspension at each supported wheel assembly 18. Therefore, the individual torsion axle assembly 150 supporting each wheel assembly 18 acts independently with respect to all remaining wheel assemblies 18 of trailer 10. An advantage of such system is to provide smoother travel of trailer 10 over rough or uneven ground surfaces.

Spindle 160 comprises an elongated conical body having a proximal end 168 and a distal end 169. Proximal end 168 of spindle 160 is sized and structured to fixedly attach to moment end 166 of torsion arm 158. Distal end 169 of spindle 160 is sized and structured to insert into and interact with a wheel assembly 18 or hub assembly (not shown).

Wheel attachment plate 174 is a generally planar structure with at least one bore hole 182 extending therethrough. The at least one bore hole 182 is sized and structured to at least partially receive a lug (not shown) from a hub (not shown) of wheel assembly 18. The at least one bore hole 182 is disposed on wheel attachment plate 174 to align with receptacle bore holes or lugs on wheel assembly 18 to fixedly secure wheel assembly 18 about spindle 160. In an example embodiment, connection is by at least one bolt 183.

Housing 70 extends through opening 170 of first side frame member 22 and opening 172 of support beam 27. Housing 70 is fixedly attached to first side frame member 22 and support beam 27. Housing 70 is constructed of a relatively strong and durable material, such as steel. Through extension of housing 70 through openings 172 and 170, the distance of cargo deck 60 from the ground may be minimized.

Sleeve 152 and its corresponding axle assembly 150 may be readily inserted and removed from housing 70. Sleeve 152 is inserted into housing 70 until flange 180 abuts vertical bar 44. Bolts 184 of flange 180 are attached through bore hole 178 and corresponding bore hole 176 in vertical bar 44, thereby fixing flange 180 against vertical bar 44 of side frame member 22 and fixedly positioning sleeve 152 and axle assembly 150 in housing 70. To remove an axle assembly 150, the at least one bolt 184 is disconnected to allow sleeve 152 and axle assembly 150 to be pulled from housing 70. Such operation may be conducted separately for axle assembly 150. Accordingly, it is only necessary to lift a corresponding side of trailer 10 to replace an axle assembly 150.

Trailer 10 is constructed with fenders 50. Fenders 50 are disposed on each side of frame 12 proximate side frame members 22 and 23 to at least partially envelope corresponding wheel assemblies 18. Fenders 50 are constructed to extend less than the full length of frame members 22 and 23. In the example embodiment, deck curbs 63 extend around the perimeter of deck 60. Deck curbs 63 are of limited height to allow equipment stabilizers 104 to be extendable outwardly and downwardly over deck curbs 63. In an alternative example shown in FIG. 2 curbs are not provided around deck 60. Such limited height deck curbs 63 and curbless deck 60 in combination with fenders that do not extend the full length of side members 22 and 23 are referred to herein as trailer open sides. Each fender 50 may be fixedly attached to or integrally formed with a corresponding frame member 22 or 23.

Referring to FIG. 2, trailer 10 may be used with a piece of equipment 100. Equipment 100 may be of the variety having continuous tracks 108 or tires (not shown).

Trailer 10 is constructed for use with equipment 100 having stabilizers 104. In the example embodiment, equipment 100 has four stabilizers 104, attached to body 101 of equipment 100. Each stabilizer 104 includes a foot 110 distal the body 101 of equipment 100. Foot 110 is operable between a retracted orientation where foot 110 is proximate body 101 and operational position wherein foot 110 is rotated outwardly and down to the ground or a support structure (not shown). A function of each stabilizer 104 is to engage the ground or other support and lift or stabilize equipment 100.

Trailer 10 is constructed with fenders 50 extending less than the entire length of sides 22 and 23. Trailer 10 is otherwise constructed with open sides that allow extension of stabilizers 104 outside the perimeter of frame 12, thus allowing stabilizers 104 to be operational to lift or stabilize equipment 100 while equipment 100 is positioned on trailer 10.

With housing 70 extending through opening 170 of vertical bar 44 and 172 of support beam 27, cargo deck 60 is oriented a relatively low distance from the ground, facilitating use of stabilizers 104 of equipment 100 while mounted on trailer 10 in that the stabilizers 104 can reach the ground while equipment 100 is positioned on cargo deck 60.

Operation

Figure 6:
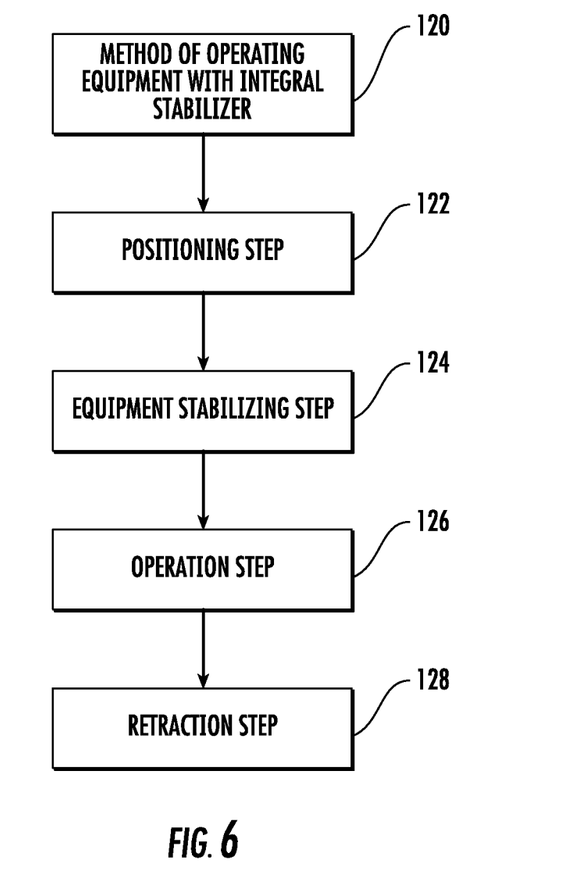
FIG. 6 is a block diagram of a method for loading and operating equipment.

FIG. 6 illustrates a method 120 of operating equipment 100 with stabilizers 104 on trailer 10.

A positioning step 122 comprises positioning the equipment 100 on cargo deck 60 of the trailer 10.

A stabilizing step 124 comprises extending stabilizers 104 to operational position in which stabilizer 104 feet 110 engage the ground or other support structure (not shown).

An operation step 126 comprises operating equipment 100 while positioned on cargo deck 60 of trailer 10.

A retraction step 128 comprises retraction of stabilizers 104.

Optionally, other steps may be added to the method 120, such steps including a loading step comprising loading equipment 100 on to trailer 10 cargo deck 60, a securing step comprising securing equipment 100 on trailer 10, a transport step comprising transporting equipment 100 and trailer 10 to a determined location, and a trailer stabilizing step comprising lowering trailer stabilizing jacks 30 to contact the ground or a support structure, and a jack retraction step comprising raising stabilizing jacks 30 to disengage any contact with the ground or support structure.

Figure 7:
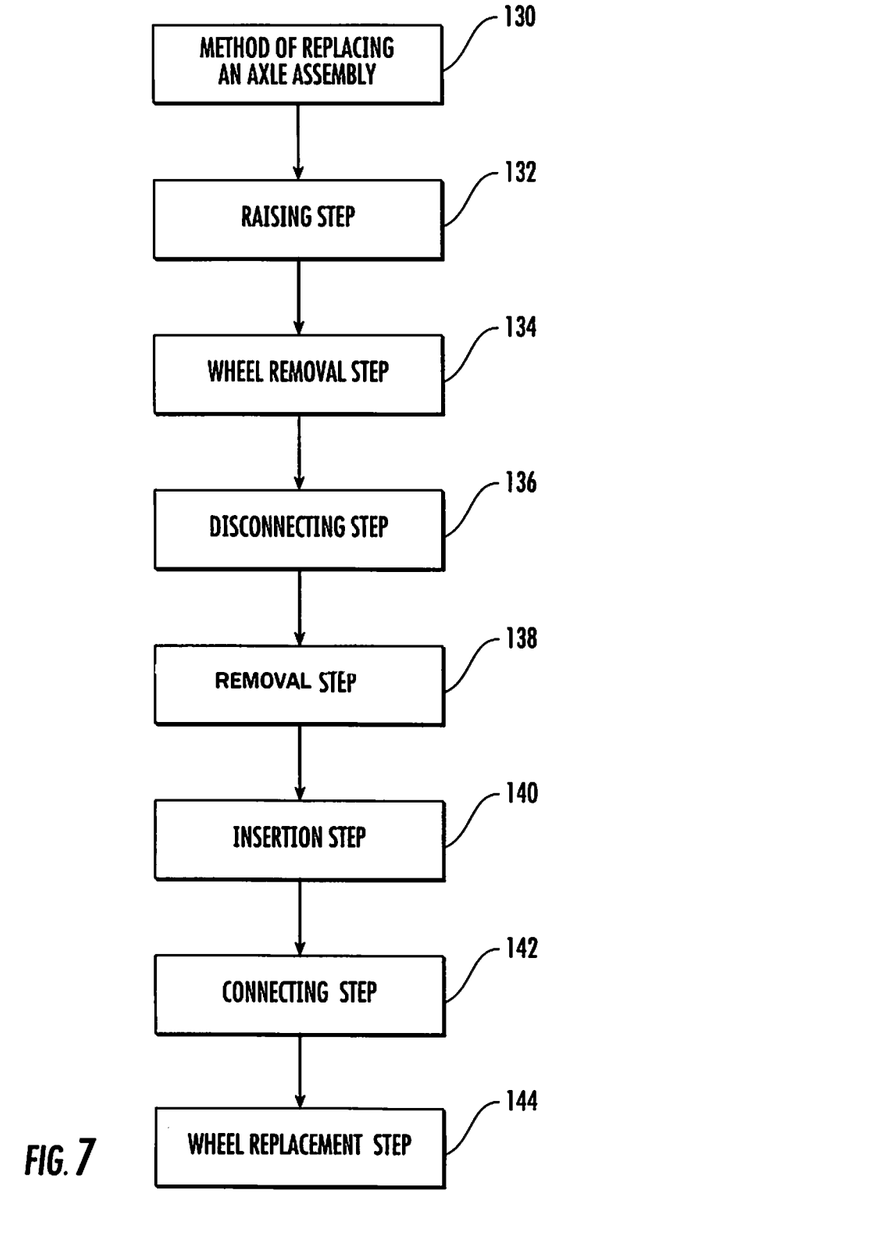
FIG. 7 is a block diagram of a method for replacing an axle assembly.

FIG. 7 illustrates a method 130 of replacing an axle assembly 150.

A raising step 132 comprises raising a side of trailer 10 having an axle assembly 150 to be replaced. The raising step 132 may be conducted with conventional raising means including a stabilizing jack 30.

A wheel removal step 134 comprises disconnecting wheel assembly 18 from wheel attachment plate 174 by removing wheel lugs (not shown) and pulling wheel assembly 18 off spindle 60.

A disconnecting step 136 comprises disconnecting flange 180 from vertical bar 44 by removing bolts 184.

A removal step 138 comprises removing axle assembly 150 from housing 70 through opening 170 of side frame member 22.

An insertion step 140 comprises inserting replacement axle assembly 150 into housing 70 through opening 170 of side frame member 22.

A connecting step 142 comprises attaching flange 180 of replacement axle assembly 150 to vertical bar 44 of side frame member 22 by replacing and tightening bolts 184.

A wheel replacement step 144 comprises replacing wheel assembly 18 on to spindle 60 and securing wheel assembly 18 to wheel attachment plate 174 by tightening lugs (not shown).

Optionally, other steps may be added to the method 130, such steps including a lowering step comprising lowering the side of trailer 10 having the replacement axle assembly 150, a lug loosening step comprising loosening lugs (not shown) prior to raising step 132, and a lug tightening step comprising tightening lugs (not shown) after lowering step.

Alternative Embodiments

In an alternative embodiment of the present invention, housing 70 does not extend through support beam 27. In such embodiment, an inner end of housing 70 distal side frame member 22 is fixedly attached to support beam 27 with vertical bar 48 defining a closed end of housing 70.

In a second alternative embodiment, depicted in FIG. 4A, housing 70 extends across frame 12 from side member 22 to side member 23. In such embodiment, housing 70 may extend through one or more support beams 27. In such embodiment, an axle assembly 150 is inserted into each end of said housing 70 and each axle assembly 150 and sleeve 152 extend no more than one half of the total length of housing 70.

In a third alternative embodiment, housing 70 extends across frame 12 from side member 22 to side member 23 and is positioned under each side member 22 and 23. In such embodiment housing 70 may extend under or through one or more support beams 27. In such embodiment, each axle assembly 150 and sleeve 152 extend no more than one half of the total length of housing 70.

Throughout the description and claims of this specification, the words "comprise" and "contain" and variations of the words, for example "comprising" and "comprises", means "including but not limited to."

Throughout the description and claims of this specification, the singular encompasses the plural unless the context otherwise requires. In particular, where the indefinite article is used, the specification is to be understood as contemplating plurality as well as singularity, unless the context requires otherwise.

Features and characteristics described in conjunction with a particular aspect, embodiment or example of the invention are to be understood to be applicable to any other aspect, embodiment or example described herein unless incompatible therewith.

All of the features disclosed in this specification (including any accompanying claims, abstract and drawings), and/or all of the steps of any method of process so disclosed, may be combined in any combination, except combinations where at least some of such features and/or steps are mutually exclusive.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

I claim:

1. A low profile trailer comprising:
   a frame having a first side frame member and a second side frame member;
   said first side frame member having a first exterior side surface;
   said second side frame member have a second exterior side surface;
   a first housing extending through said first side frame member;
   a second housing extending through said second side frame member;
   a first axle assembly insertable in said first housing;
   a second axle assembly insertable in said second housing;
   said first axle assembly having a first attachment flange;
   said second axle assembly having a second attachment flange;
   said first axle assembly removeably attachable to said first frame member by bolting through said first exterior side surface of said first frame member;
   said second axle assembly removeably attachable to said second frame member by bolting through said second exterior side surface of said second frame member;
   said trailer having trailer open sides;
   at least one stabilizer jack attached to said trailer frame;
   said first axle assembly further comprising a first torsion bar and a first torsion bar sleeve;
   said first torsion bar supported in said first torsion bar sleeve;
   said first torsion bar sleeve slidably received in said first housing;
   said second axle assembly further comprising a second torsion bar and a second torsion bar sleeve;
   said second torsion bar supported in said second torsion bar sleeve;
   said second torsion bar sleeve slidably received in said second housing;
   said first attachment flange fixedly attached to said first torsion bar sleeve;
   said second attachment flange fixedly attached to said second torsion bar sleeve;
   an exterior surface of said first torsion bar sleeve slidably contacting an interior surface of said first housing;
   an exterior surface of said second torsion bar sleeve slidably contacting an interior surface of said second housing;
   said first sleeve extends less than one-half of the trailer deck width;
   said second sleeve extends less than one-half of the trailer deck width;

said first housing connected to a first support beam distal said first attachment flange;

said second housing connected to a second support beam distal said second attachment flange;

said first housing extending though an opening provided in said first support beam; and said second housing extending through an opening provided in said second support beam.

2. A low profile trailer according to claim 1 wherein:

said first support beam and second support beam comprise a common beam.

\* \* \* \* \*